United States Patent
Li et al.

(10) Patent No.: US 8,155,254 B2
(45) Date of Patent: Apr. 10, 2012

(54) METHODS AND SYSTEMS USING FFT WINDOW TRACKING ALGORITHM

(75) Inventors: Junqiang Li, Sunnyvale, CA (US); Je Woo Kim, Cupertino, CA (US); Matthias Brehler, Boulder, CO (US); Michael McCloud, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 559 days.

(21) Appl. No.: 12/337,632

(22) Filed: Dec. 18, 2008

(65) Prior Publication Data

US 2010/0158170 A1    Jun. 24, 2010

(51) Int. Cl.
    *H03D 1/04*    (2006.01)
(52) U.S. Cl. .................... 375/346; 375/260
(58) Field of Classification Search .......... 375/346, 375/349, 260; 370/208, 210
    See application file for complete search history.

(56) References Cited

U.S. PATENT DOCUMENTS

| | | | | |
|---|---|---|---|---|
| 2003/0117943 | A1* | 6/2003 | Sakata et al. | 370/210 |
| 2008/0304587 | A1* | 12/2008 | Setoh et al. | 375/260 |

FOREIGN PATENT DOCUMENTS

WO    WO2008/064707 A1    6/2008

OTHER PUBLICATIONS

Brugger R, et al., "OFDM Receivers—Impact on Coverage of Inter-Symbol Interference and FFT Window Positioning", EBU Review Technical, European Broadcasting Union, Geneva, CH, No. 295, Jul. 1, 2003, pp. 1-12, XP002317591, ISSN: 1018-7391.
Dong Wang et al: "Timing Synchronization for MIM0-0FDM WLAN Systems" IEEE Wireless Comminications and Networking Conference, 2007, WCNC 2007, Mar. 11-15, 2007, Hong Kong, IEEE Operations Center, Piscataway, NJ, Mar. 1, 2007, pp. 1177-1182, XP03197361 ISBN: 978-1-4244-0658-6 p. 1180, right-hand col., line 17—p. 1181, left-hand col., line 28.
International Search Report and Written Opinion—PCT/US2009/067891, International Search Authority—European Patent Office—Mar. 24, 2010 (081652WO).

\* cited by examiner

*Primary Examiner* — Kevin Kim
(74) *Attorney, Agent, or Firm* — Larry Moskowitz; Milan I Patel

(57) ABSTRACT

Techniques for the adjustment of a position of Fast Fourier Transform (FFT) window are provided. The adjustment may be based on the condition that the length of channel impulse response is larger than the length of cyclic prefix. The technique may determine a position of the FFT window that attempts to maximize carrier-to-noise (C/N) ratio value measured at the receiver.

24 Claims, 13 Drawing Sheets

METHODS AND SYSTEMS USING FFT WINDOW TRACKING ALGORITHM

TECHNICAL FIELD

The present disclosure generally relates to communication and more specifically to a method for optimal adjustment of an FFT window position at a receiver in OFDM systems under the condition that the length of channel impulse response is larger than the length of cyclic prefix.

SUMMARY

Certain embodiments provide a method for determining an optimal position of a Fast Fourier Transform (FFT) window at a receiver of an orthogonal frequency division multiplex (OFDM) wireless communication system under the condition that the channel impulse response (CIR) length is larger than the cyclic prefix (CP) length. The method generally includes receiving a plurality of adjacent OFDM symbols in time where the received signal is modeled in frequency domain, estimating a power of a desired signal collected inside the FFT window for a currently processed OFDM symbol from an arbitrary channel path based on different relative positions between a beginning of the FFT window and a time delay of arbitrary channel path, estimating a power of the noise collected inside the FFT window for the currently processed OFDM symbol from the arbitrary channel path based on different relative positions between the beginning of the FFT window and the time delay of arbitrary channel path, computing a theoretical carrier-to-noise (C/N) ratio at the receiver as a function of the FFT window position based on the estimated power of desired signal and the estimated power of the noise, and determining the optimal position of the FFT window in an effort to optimize the theoretical C/N ratio value at the receiver.

Certain embodiments provide an apparatus for determining an optimal position of a Fast Fourier Transform (FFT) window at a receiver of an orthogonal frequency division multiplex (OFDM) wireless communication system under the condition that the channel impulse response (CIR) length is larger than the cyclic prefix (CP) length. The apparatus generally includes logic for receiving a plurality of adjacent OFDM symbols in time where the received signal is modeled in frequency domain, logic for estimating a power of a desired signal collected inside the FFT window for a currently processed OFDM symbol from an arbitrary channel path based on different relative positions between a beginning of the FFT window and a time delay of arbitrary channel path, logic for estimating a power of the noise collected inside the FFT window for the currently processed OFDM symbol from the arbitrary channel path based on different relative positions between the beginning of the FFT window and the time delay of arbitrary channel path, logic for computing a theoretical carrier-to-noise (C/N) ratio at the receiver as a function of the FFT window position based on the estimated power of desired signal and the estimated power of the noise, and logic for determining the optimal position of the FFT window in an effort to optimize the theoretical C/N ratio value at the receiver.

Certain embodiments provide an apparatus for determining an optimal position of a Fast Fourier Transform (FFT) window at a receiver of an orthogonal frequency division multiplex (OFDM) wireless communication system under the condition that the channel impulse response (CIR) length is larger than the cyclic prefix (CP) length. The apparatus generally includes means for receiving a plurality of adjacent OFDM symbols in time where the received signal is modeled in frequency domain, means for estimating a power of a desired signal collected inside the FFT window for a currently processed OFDM symbol from an arbitrary channel path based on different relative positions between a beginning of the FFT window and a time delay of arbitrary channel path, means for estimating a power of the noise collected inside the FFT window for the currently processed OFDM symbol from the arbitrary channel path based on different relative positions between the beginning of the FFT window and the time delay of arbitrary channel path, means for computing a theoretical carrier-to-noise (C/N) ratio at the receiver as a function of the FFT window position based on the estimated power of desired signal and the estimated power of the noise, and means for determining the optimal position of the FFT window in an effort to optimize the theoretical C/N ratio value at the receiver.

Certain embodiments provide a computer-program product for determining an optimal position of a Fast Fourier Transform (FFT) window at a receiver of an orthogonal frequency division multiplex (OFDM) wireless communication system under the condition that the channel impulse response (CIR) length is larger than the cyclic prefix (CP) length, comprising a computer readable medium having instructions stored thereon, the instructions being executable by one or more processors. The instructions generally include instructions for receiving a plurality of adjacent OFDM symbols in time where the received signal is modeled in frequency domain, instructions for estimating a power of a desired signal collected inside the FFT window for a currently processed OFDM symbol from an arbitrary channel path based on different relative positions between a beginning of the FFT window and a time delay of arbitrary channel path, instructions for estimating a power of the noise collected inside the FFT window for the currently processed OFDM symbol from the arbitrary channel path based on different relative positions between the beginning of the FFT window and the time delay of arbitrary channel path, instructions for computing a theoretical carrier-to-noise (C/N) ratio at the receiver as a function of the FFT window position based on the estimated power of desired signal and the estimated power of the noise, and instructions for determining the optimal position of the FFT window in an effort to optimize the theoretical C/N ratio value at the receiver.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
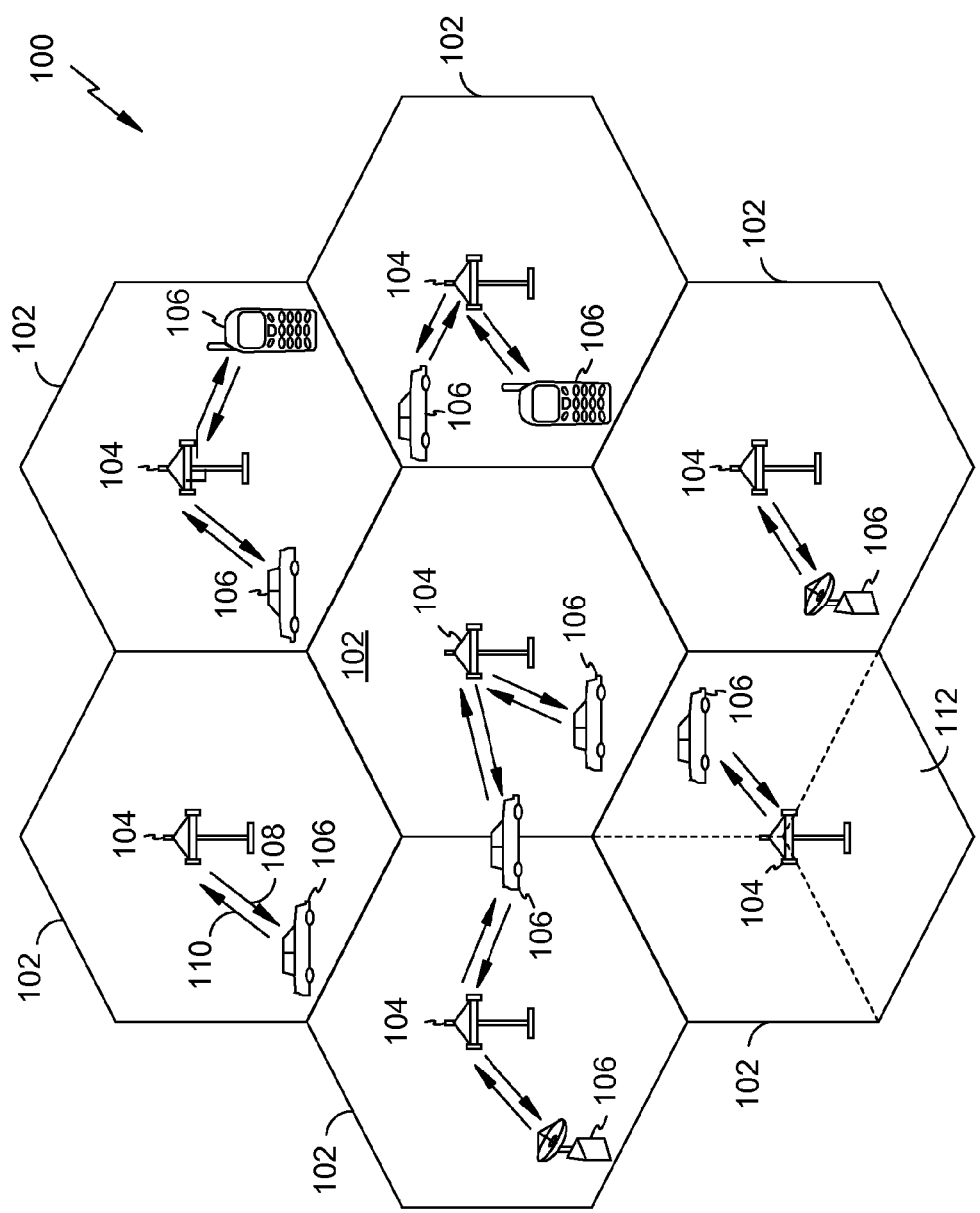
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

Communication systems are widely deployed to provide various communication services such as voice, packet data, etc. These systems may be time, frequency, and/or code division multiple-access based systems capable of supporting a simultaneous communication with multiple users by sharing available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Orthogonal Frequency Division Multiplexing (OFDM) or Orthogonal Frequency Division Multiple Access (OFDMA) are exemplary protocols that are widely utilized in wireless environments to transmit and receive data. OFDM scheme modulates digital information onto an analog carrier electromagnetic signal, and is utilized in the IEEE 802.11a/g WLAN standard, 802.16, and 802.20. An OFDM baseband signal is a sum of a number of orthogonal subcarriers, where each subcarrier is independently modulated by its own data. Benefits of OFDM over other conventional wireless communication protocols include ease of filtering noise, ability to vary upstream and downstream data rates (which can be accomplished by way of allocating more or fewer subcarriers for each purpose), ability to mitigate effects of frequency-selective fading, etc.

A Fast Fourier Transform (FFT) of time domain received samples may be employed as an integral part of processing at the receiver of OFDM wireless system. The FFT operation may need to be applied within an appropriate time window in order to preserve orthogonality of subcarriers. A position of the time window for FFT operation may directly correspond to a boundary between adjacent OFDM symbols in time. Therefore, in order to effectively employ OFDM as a communications protocol, position of the FFT window may need to be accurately determined at the receiver.

A cyclic prefix (CP) can be located at a portion of an OFDM symbol that may be located first in time, and can include samples that exist within the OFDM symbol that may be located last in time. Therefore, a boundary between adjacent OFDM symbols that include cyclic prefixes (CPs) may be determined by locating CPs within OFDM symbols. A correlating unit (e.g., a cross-correlator, an autocorrelator, a delay correlator, etc) may correlate the CP with samples within the OFDM symbol and evaluate a correlation energy. The peak energy level may be indicative of the boundary between OFDM symbols, and thereafter an FFT operation may be applied to samples within the OFDM symbol delivered at the receiver next in time. If a multi-path effect is not an issue for a particular wireless environment and no noise exists upon such wireless channel, the peak energy determined by the correlating component could be utilized to precisely locate the boundary between OFDM symbols (position of the FFT window).

Channels, however, are frequently associated with various types of noise thus rendering it more difficult to determine location of the peak energy level output by the correlating unit. Furthermore, wireless channels are often subject to the multi-path effect, wherein disparate portions of a symbol are delivered over different physical paths (or substantially similar portions of a signal are delivered over disparate physical paths), which can cause delay with respect to a receiver observing a plurality of samples. Thus, output of a correlating unit can produce a heightened flat energy level that does not include a peak energy level corresponding to the boundary between OFDM symbols. Moreover, when noise is accumulated on a wireless channel, it can be difficult to accurately determine the boundary between OFDM symbols. In particular, if there is a substantial disparity with respect to location in time of an energy peak determined by the correlating unit and location of the boundary between adjacent OFDM symbols in time, errors can occur, thereby compromising accuracy of the receiver.

In order to mitigate inter-symbol interference (ISI) between adjacent OFDM symbols in time, the length of CP may be typically chosen to be larger than the length of channel impulse response (CIR). However, a portion of the OFDM symbol dedicated for the CP may also be chosen to be smaller than the CIR length in order to increase the spectral efficiency and information throughput. In the case when the length of CIR is larger than the length of CP, determination of the precise location of the beginning of the FFT window (boundary between adjacent OFDM symbols) may become even more difficult due to a high level of inter-symbol interference (ISI) that originates from adjacent OFDM symbols in time.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
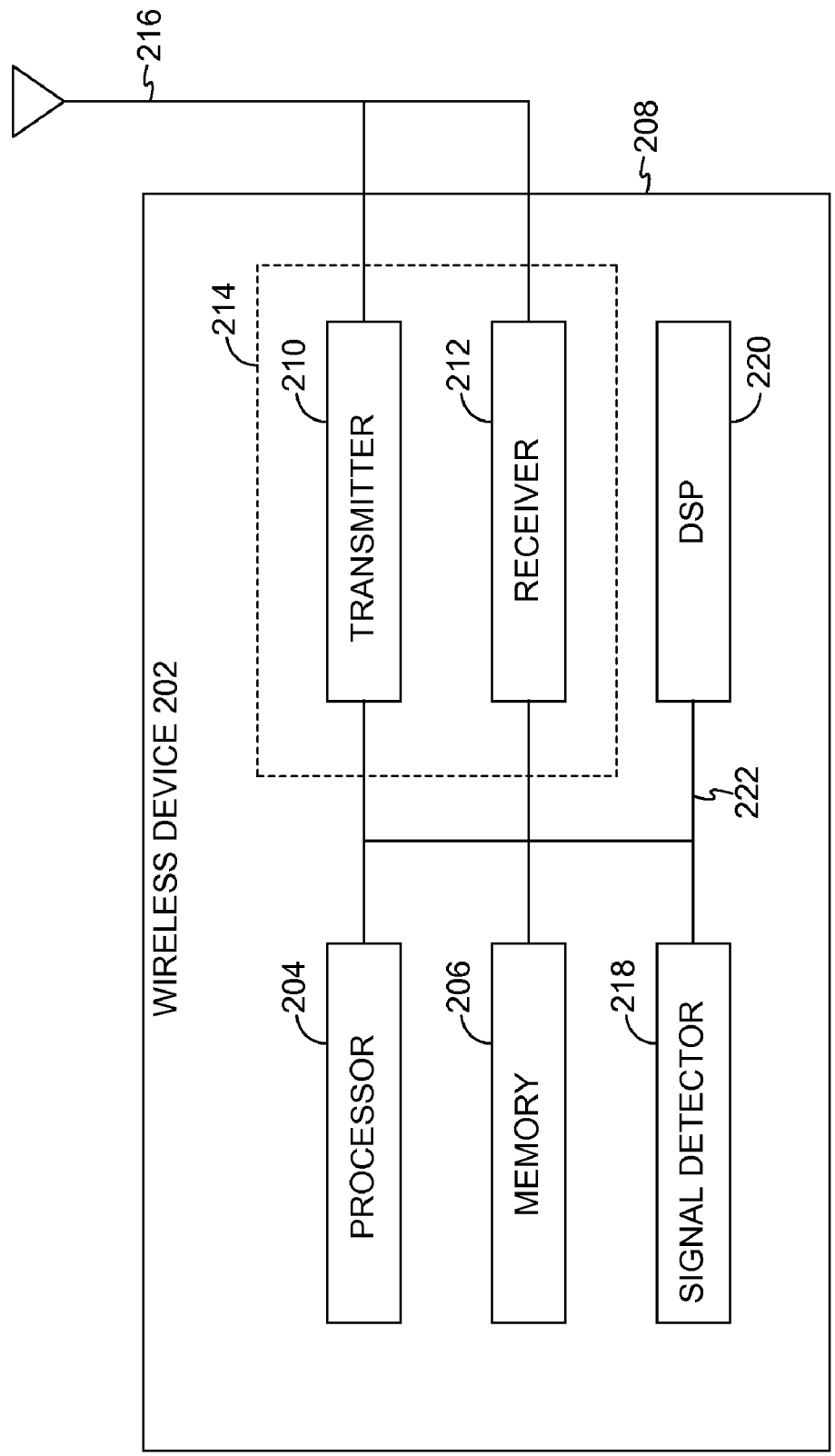
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
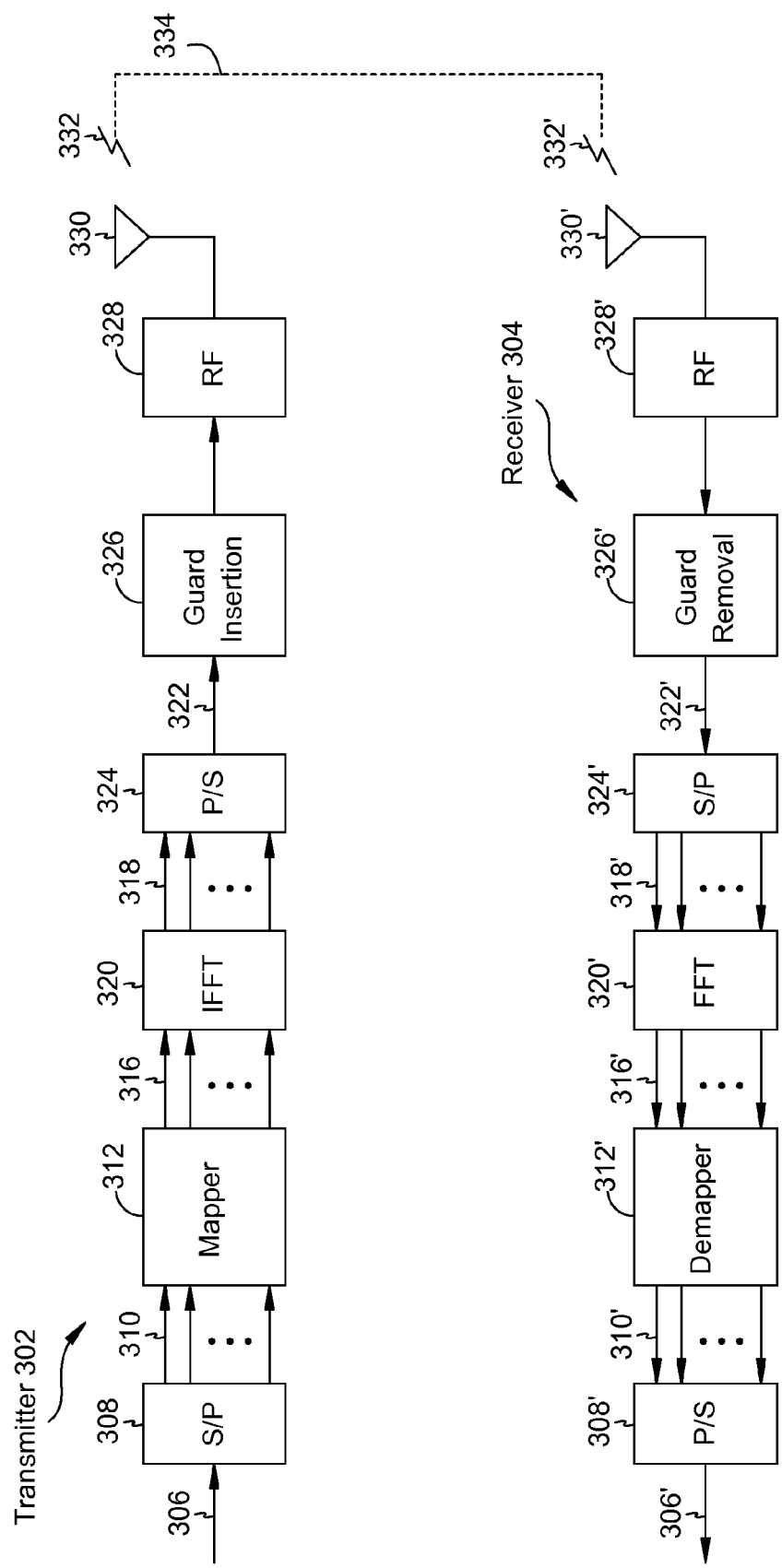
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, NS, is equal to NCP (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary FFT Window Tracking Based on Maximizing C/N Ratio

Optimal adjustment of a position of FFT window at the receiver based on maximizing the C/N ratio is proposed in the present disclosure for OFDM systems operating in high scattering channel environments (channels with a strong multi-path effect), while the length of channel impulse response (CIR) is larger than the length of cyclic prefix (CP). Estimation of the channel and the noise power are also considered in the present disclosure by utilizing previously determined position of FFT window. Because the adjustment of the FFT window position may be based on maximizing the carrier-to-noise (C/N) ratio value at the receiver, the relationship between the C/N ratio and the FFT window position may need first to be established. It can be assumed in the following analysis that the channel impulse response may be fully known at the receiver.

Time Domain Model of the Received Signal and Approximate C?N Calculation

Figure 4:
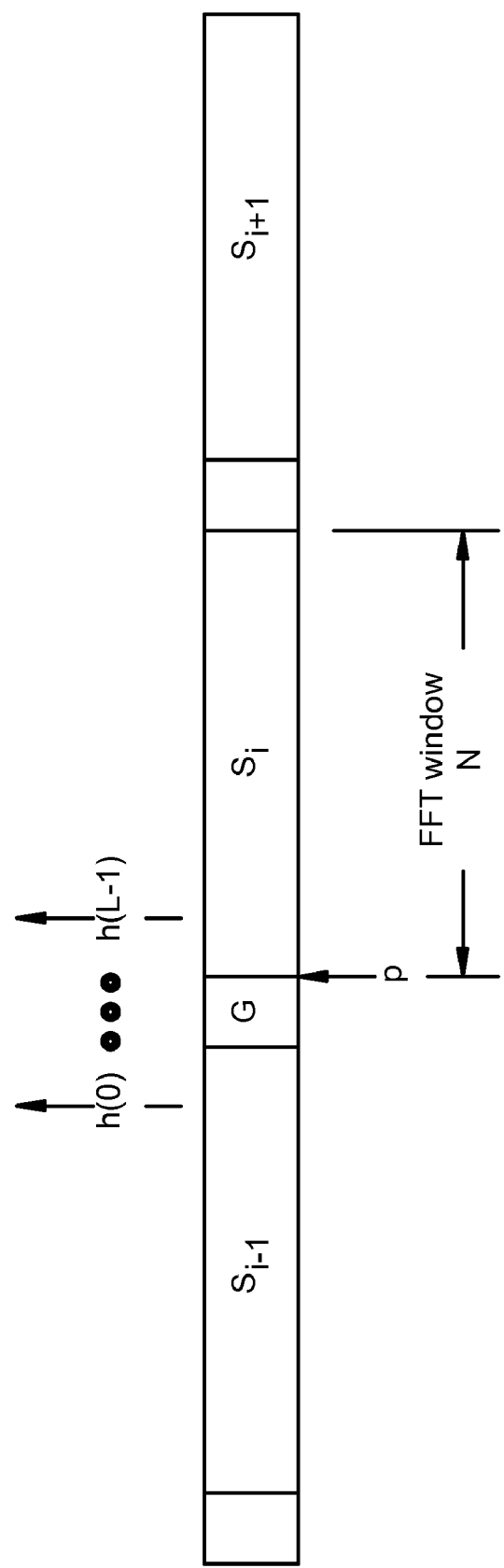
FIG. 4 illustrates an example FFT window position when the length of channel impulse response (CIR) is larger than the length of cyclic prefix (CP) in accordance with certain embodiments of the present disclosure.

FIG. 4 illustrates an example of the FFT window position in the case when the CIR length is larger than the CP length. The transmission signal $s_i(n)$ that corresponds to the nth tone (sample) of the ith OFDM symbol obtained by applying an Inverse Fast Fourier Transform (IFFT) may be expressed as:

$$s_i(n) = \sum_{k=-N/2}^{N/2} S_{i,k} e^{j2\pi k \frac{(n-G)}{N}}, \quad (1)$$

where G is the length of CP, N is the size of IFFT operation applied at the transmitter (same as the size of FFT operation applied at the receiver), $i \cdot (N+G) \leq n \leq (i+1) \cdot (N+G)$, $S_{i,k}$ is the frequency domain transmission signal at the kth subcarrier of the ith OFDM symbol, and $s_i(n)$ may satisfy the following:

$$s_i(n) = \begin{cases} \text{non zero} & i \cdot (N+G) \leq n < (i+1) \cdot (N+G) \\ 0 & \text{otherwise.} \end{cases} \quad (2)$$

It can be assumed a total of L channel paths with the time delay of $d_l$ for the arbitrary lth channel path (l=0, 1, ..., L−1). The CIR length may be defined as a difference between time delays of the last and the first arriving channel path, and may be larger than the CP length: $d_{L-1} - d_0 > G$. The channel impulse response within a certain observation window with a starting point p may be represented as:

$$h(n) = \sum_{l=0}^{L-1} h_l \delta(n - d_l), \quad (3)$$

where $h_l$ is the channel impulse response at the arbitrary lth channel path, and δ is a Dirac impulse function that can be defined as:

$$\delta(n) = \begin{cases} \text{nonzero}, & n = 0 \\ 0, & n \neq 0, \end{cases} \quad (4)$$

and a Dirac impulse is also constrained to satisfy the following identity:

$$\int_{-\infty}^{+\infty} \delta(n) dn = 1. \quad (5)$$

For certain embodiments of the present disclosure it can be assumed that the starting position p of the FFT window may satisfy:

$$d_{L-1} - G - N < p < d_0 + N \quad (6)$$

where N is the number of samples within the FFT window. Channel paths that are not satisfying expression (6) may be considered as inter-symbol interference (ISI) components that originate from adjacent OFDM symbols in time.

The received signal captured within the FFT window with a starting position p that satisfies i·(N+G)+p≤n<i·(N+G)+p+N for the nth sample of the ith OFDM symbol may be represented in the time domain as:

$$r_i(n) = w(n - i(N+G) - p) \times \left\{ \sum_{l:l=0}^{d_l<p} h_l \cdot s_i(n-d_l) + \sum_{l:d_l \geq p}^{d_l<p+G} h_l \cdot s_i(n-d_l) + \right.$$
$$\sum_{l:d_l \geq p+G}^{d_{L-1}} h_l \cdot s_i(n-d_l) + \sum_{l:d_l > p+G}^{d_{L-1}} h_l \cdot s_{i-1}(n+N+G_s-d_l) +$$
$$\left. \sum_{l:l=0}^{d_l<p} h_l \cdot s_{i+1}(n-N-G-d_l) + \eta(n) \right\}, \quad (7)$$

where η(n) is the noise variance for the nth sample of the ith OFDM symbol, and w(•) is a rectangular window satisfying:

$$w(n) = \begin{cases} 1 & 0 \leq n < N+G \\ 0 & \text{otherwise.} \end{cases} \quad (8)$$

Figure 5:
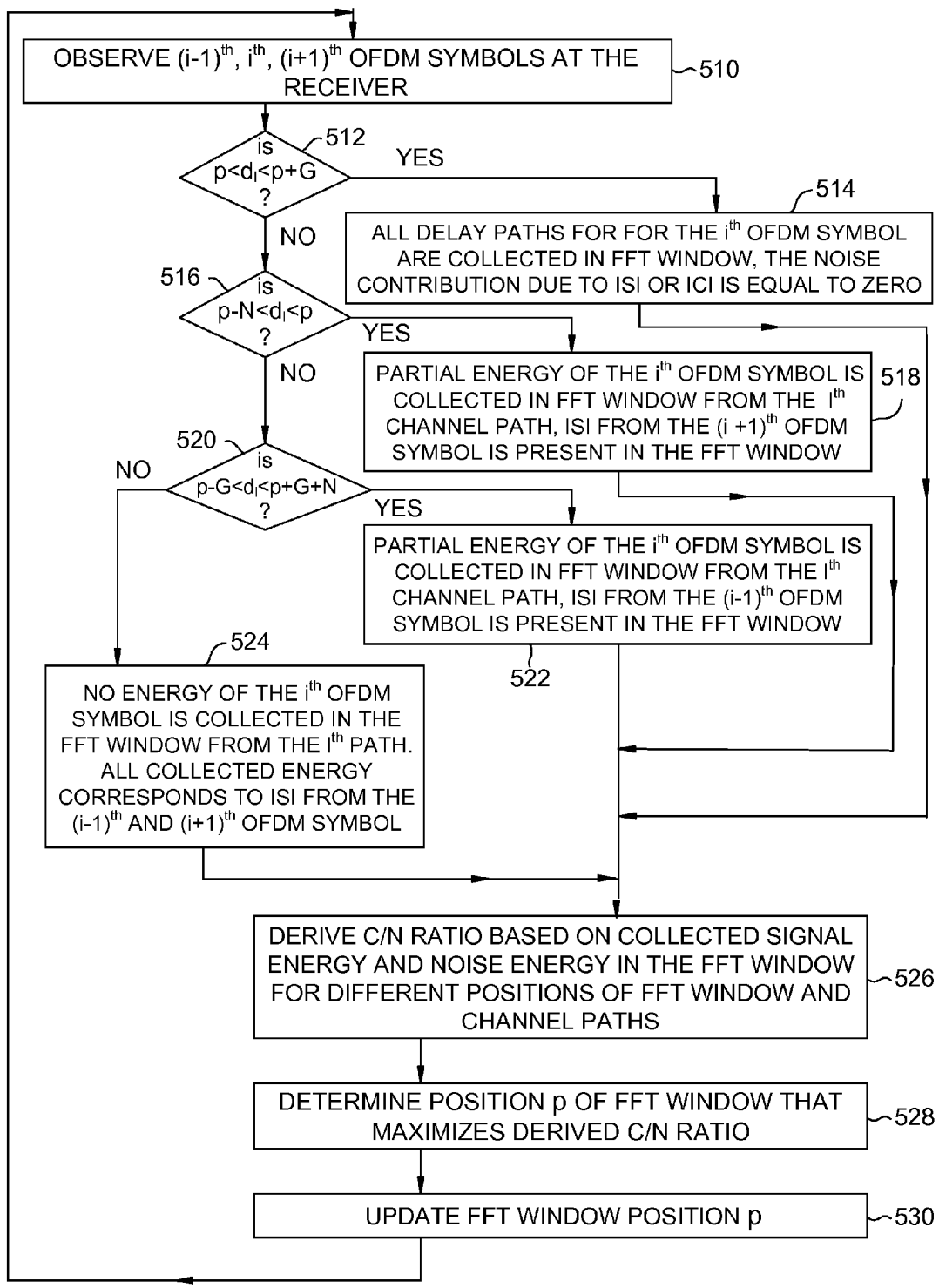
FIG. 5 illustrates example operations for deriving the carrier-to-noise (C/N) ratio as a function of the FFT window position and determining an FFT window position in accordance with certain embodiments of the present disclosure.

FIG. 5 shows a process of deriving a C/N ratio value and determining the FFT window position by maximizing the C/N ratio at the receiver. In order to simplify an analysis of signal and noise components within equation (7), desired signal and noise in every term of equation (7) may be individually analyzed for all possible relative positions of the FFT window and the arbitrary lth channel path. Noise components may be composed of an inter-symbol interference (ISI) and an inter-carrier interference (ICI).

The operations shown in FIG. 5 illustrate how the analysis of signal and noise (e.g., ISI and ICI components) contributions of adjacent OFDM symbols (i−1 and i+1) when processing a current OFDM symbol (i), may be simplified based on the relative values of the size N of the FFT window with a starting point p, channel delay dl, and cyclic prefix length G. As illustrated by the different decision blocks, the signal and noise components can be generally described with the following several cases, with the contributions of energy collected in the FFT window by adjacent symbols varying in each case.

In the first case (Case 1), the path delay in the second term in EQ. (7) is within the interval of p≤$d_l$<p+G. In this case, all delay paths for the i-th symbol is collected in FFT window and the noise contribution due to ISI or ICI must be 0. In the second case (Case 2), the paths in the first and fifth terms in EQ. (7) satisfy p−N<$d_l$<p. In this case, only the partial energy of the i-th symbol is collected in the FFT window from the l-th path and the ISI is introduced from the i+1st symbol. In the third case (Case 3), the paths in the third and fourth terms in EQ. (7) satisfy p+G<$d_l$<p+G+N. Similarly to case 2, only the partial signal energy of the i-th symbol is collected in the FFT window from the l-th path and ISI is introduced from the i−1st symbol. In the fourth case (Case 4), $d_l$<p−N OR $d_l$≥p+G+N, no energy of the i-th symbol is collected in the FFT window from the l-th path.

At 510, several consecutive OFDM symbols in time, such as (i−1)th, ith, (i+1)th OFDM symbols, may be observed at the receiver. For certain embodiments of the present disclosure, the following expression may be satisfied (decision step 512 in FIG. 5 corresponding to Case 1):

$$p \leq d_l < p+G \quad (9)$$

for the arbitrary lth channel path, l=0, 1, ..., L−1. In this case, the path delay in the second term of equation (7) may be within the time interval defined by expression (9). At 514, all delay paths and their corresponding energy for the ith OFDM symbol may be collected inside the FFT window, while the noise contribution due to the ISI and the ICI may be equal to zero. If it is assumed a unity variance for the transmission signal, the received signal energy from the arbitrary lth channel path may be equal to $|h_l|^2$. Then, the desired signal power that corresponds to the second term of equation (7) may be computed as:

$$\delta^2_{desired,0} = \sum_{l:d_l \geq p}^{d_l<p+G} |h_l|^2. \quad (10)$$

For certain embodiments of the present disclosure, the following expression may be satisfied (decision step 516 in FIG. 5 corresponding to Case 2):

$$p-N < d_l < p \quad (11)$$

for a time delay of the arbitrary lth channel path, l=0, 1, ..., L−1. For this particular case, channel paths in the first and fifth terms of equation (7) may be located within the time interval defined by expression (11). At 518, only a partial energy of the ith OFDM symbol may be collected within the FFT window from the arbitrary lth channel path. The ISI from the (i+1)th OFDM symbol may also be captured within the FFT window, as illustrated in FIG. 6 where the block 610 represents a portion of the (i+1)th OFDM symbol collected inside the FFT window.

Figure 6:
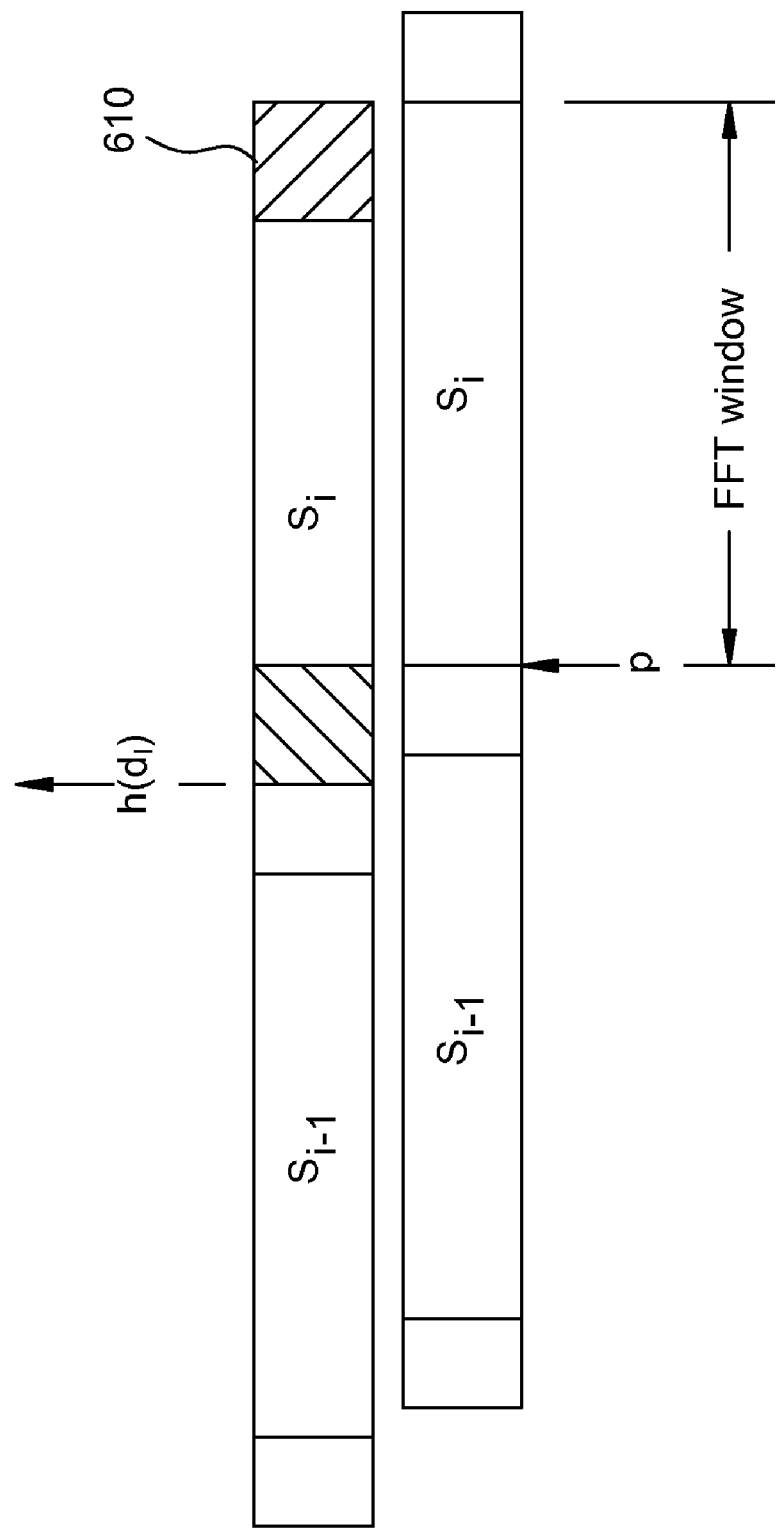
FIG. 6 illustrates a signal received from the arbitrary lth channel path in an FFT window for an exemplary position of FFT window in accordance with certain embodiments of the present disclosure.
Figure 7:
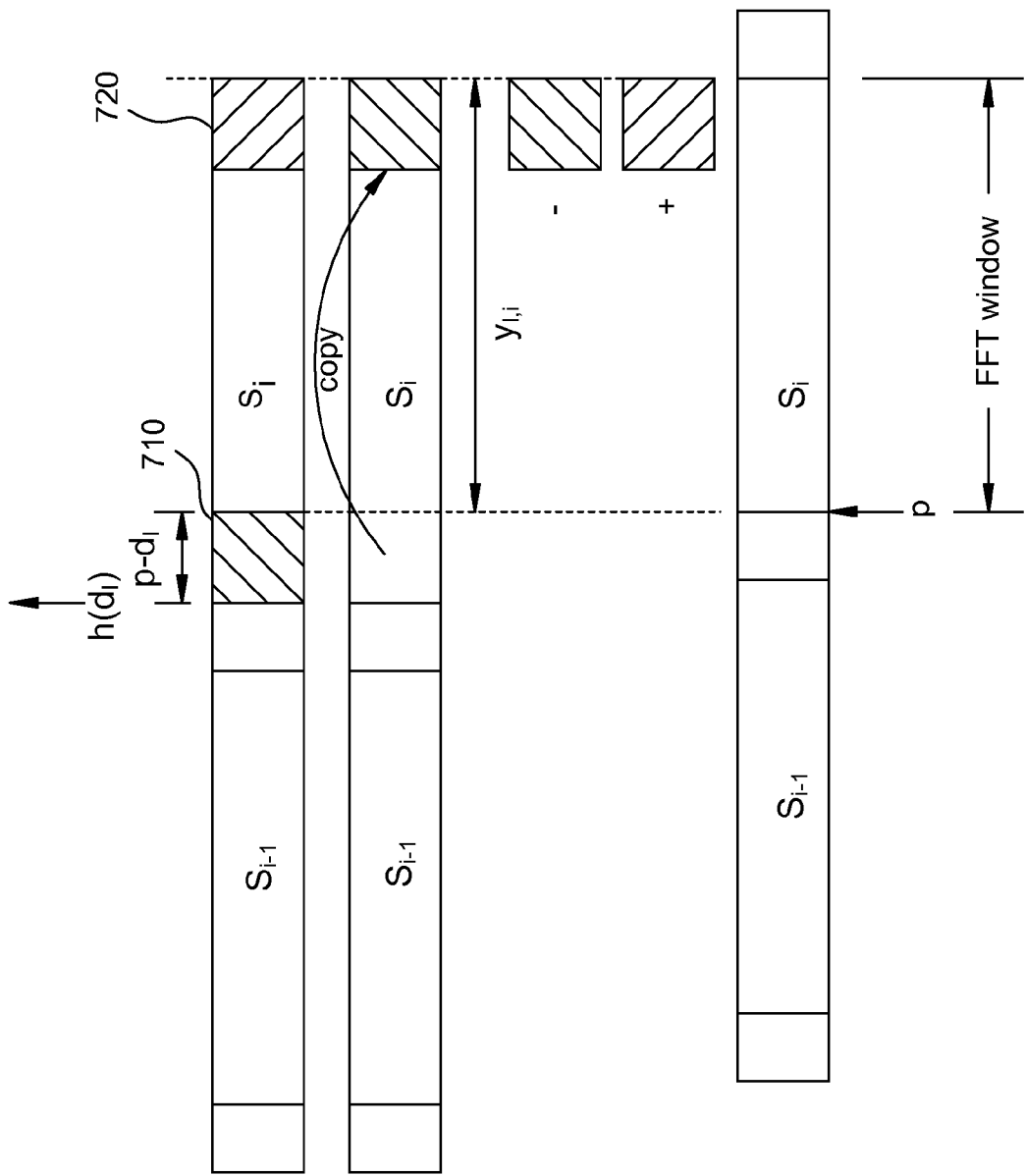
FIG. 7 illustrates an equivalent signal model with cyclic postfix for the position of FFT window from FIG. 6 in accordance with certain embodiments of the present disclosure.

In order to simplify calculation of the signal and noise energy, an equivalent model of the signal from FIG. 6 can be illustrated in FIG. 7 where a postfix extension of length p−$d_l$ may be applied on the ith OFDM symbol by copying the block 710 at the end of the ith OFDM symbol. Therefore, according to the obtained equivalent signal model $y_{l,i}$ for the arbitrary lth channel path, the approximate signal energy from the first term of equation (7) may be defined as:

$$\delta^2_{desired\_sim,1} = \sum_{l:l=0}^{d_l<p} |h_l|^2. \quad (12)$$

Noise components (i.e., ICI and ISI components) in the first and fifth items of equation (7) may be given as:

$$\delta^2_{ICI\_sim,1} = \sum_{l:l=0}^{d_l<p} \frac{-(d_l - p)}{N} |h_l|^2, \quad (13)$$

$$\delta^2_{ISI,1} = \sum_{l:l=0}^{d_l<p} \frac{-(d_l - p)}{N} |h_l|^2, \quad (14)$$

respectively. ICI and ISI noise components from equations (13) and (14) correspond to the portion of energy of the (i+1)th OFDM symbol that may be collected inside the FFT window of size N samples from the arbitrary lth channel path, as illustrated in FIG. 7 with the block 720.

For certain embodiments of the present disclosure, the time delay of the arbitrary lth channel path may satisfy the following (decision step 520 in FIG. 5 corresponding to Case 3):

$$p+G < d_l < p+G+N \quad (15)$$

Figure 8:
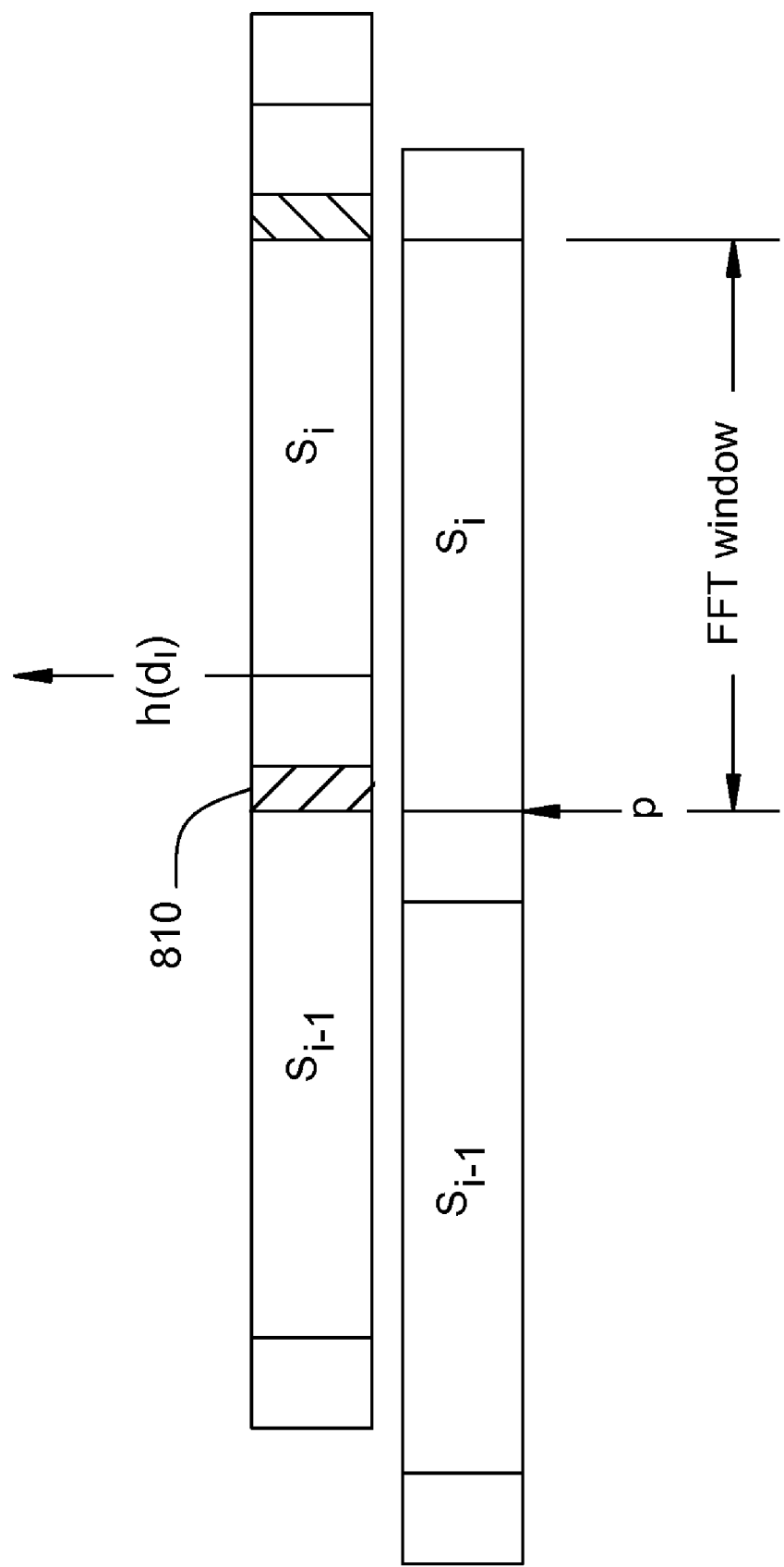
FIG. 8 illustrates a signal received from the arbitrary lth channel path in the FFT window for another exemplary position of FFT window in accordance with certain embodiments of the present disclosure.

In this particular case, channel paths in the third and fourth terms of equation (7) may satisfy expression (15). As illustrated in FIG. 8, only the partial signal energy of the ith OFDM symbol from the arbitrary lth channel path may be collected within the FFT window, at 522. The ISI from the (i−1)th OFDM symbol may also be captured within the FFT window, which is illustrated in FIG. 8 with the block 810 that represents a portion of the (i−1)th OFDM symbol collected inside the FFT window.

Figure 9:
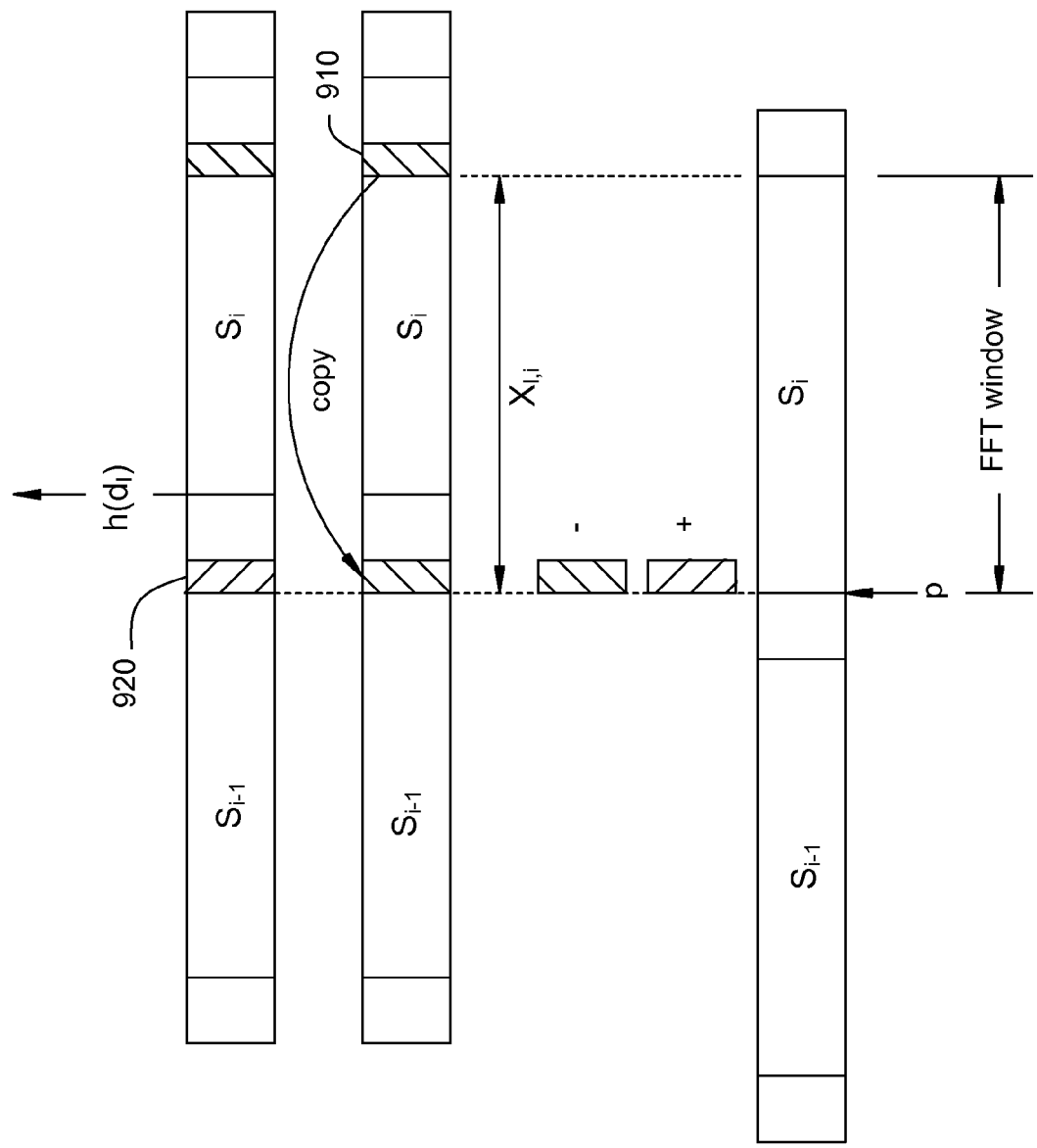
FIG. 9 illustrates an equivalent signal model with an extended prefix for the position of FFT window from FIG. 8 in accordance with certain embodiments of the present disclosure.

FIG. 9 shows utilization of the prefix extension of length $d_l-G-p$ where an equivalent signal model $x_{l,i}$ for the arbitrary lth channel path may be obtained by copying the block 910 at the beginning of the ith OFDM symbol. According to the equivalent signal model $x_{l,i}$, the signal energy from the third term of equation (7) may be approximated as:

$$\delta_{desired\_sim,2}^2 = \sum_{l:d_l>p+G}^{d_{L-1}} |h_l|^2. \tag{16}$$

Noise components (i.e., ICI and ISI components) in the third and fourth terms of expression (7) may be given as:

$$\delta_{ICI\_sim,2}^2 = \sum_{l:d_l>p}^{d_{L-1}} \frac{d_l-G-p}{N}|h_l|^2, \tag{17}$$

$$\delta_{ISI,2}^2 = \sum_{l:d_l>p}^{d_{L-1}} \frac{d_l-G-p}{N}|h_l|^2, \tag{18}$$

respectively. The ICI and ISI components given by equation (17) and (18) may correspond to the portion of energy from the (i−1)th OFDM symbol that may be collected within the FFT window of size N samples from the arbitrary lth channel path, as illustrated in FIG. 9 with the block 920.

For certain embodiments of the present disclosure, the time delay of the arbitrary lth channel path may satisfy the following (corresponding to the NO branch of decision block 520):

$$d_l<p-N \text{ or } d_l\geq p+G+N \tag{19}$$

In this particular case, no energy from the ith OFDM symbol may be collected within the FFT window of size N samples from the arbitrary lth channel path. Therefore, all energy that may be collected within the FFT window of size N samples from the lth channel path may be determined, at 524, by the sixth term of equation (7) and represents ISI components from the (i+1)th and (i−1)th OFDM symbols with noise variance $|h_l|^2$.

By considering all previously analyzed cases of relative positions between time delay of the arbitrary lth channel path (l=0, 1, ..., L−1) and the FFT window position, the time domain model of the received signal defined by equation (7) may be now rephrased as:

$$r_i(n) = w(n-i(N+G)-p) \times \left\{ \sum_{l:l=0}^{d_l<p} h_l \cdot y_{l,i}(n) - \right. \tag{20}$$

$$\sum_{l:l=0}^{d_l<p} h_l y_{l,i}(n) \cdot rect(N+G+d_l \leq n < N+G+p) +$$

-continued $$\sum_{l:d_l\geq p}^{d_l<p+G} h_l \cdot s_i(n-d_l) + \sum_{l:d_l>p+G}^{d_{L-1}} h_l \cdot x_{l,i}(n) -$$

$$\sum_{l:d_l>p+G}^{d_{L-1}} h_l x_{l,i}(n) \cdot rect(p \leq n < d_l - G) + +$$

$$\sum_{l:d_l>p+G}^{d_{L-1}} h_l \cdot s_{i-1}(n+N+G-d_l) +$$

$$\left. \sum_{l:l=0}^{d_l<p} h_l \cdot s_{i+1}(n-N-G-d_l) + \eta(n) \right\},$$

where rect(•) is the rectangular window function, $y_{l,i}(n)$ is an equivalent received signal model with the cyclic postfix illustrated in FIG. 7, and $x_{l,i}(n)$ is an equivalent received signal model with extended cyclic prefix illustrated in FIG. 9. According to the time domain signal model defined by equation (20) and the previous analysis of various component of signal and noise energy, the C/N ratio value at the receiver may be approximately computed, at 526, as:

$$\frac{C}{N_{approx}} = \frac{\delta_{desired,0}^2+\delta_{desired\_sim,1}^2+\delta_{desired\_sim,2}^2}{\delta_{ICI\_sim,1}^2+\delta_{ICI\_sim,2}^2+\delta_{ISI,1}^2+\delta_{ISI,2}^2+\delta_\eta^2} = \tag{21}$$

$$= \frac{\sum_{l=0}^{L-1}|h_l|^2}{\sum_{l:l=0}^{d_l<p}\frac{-2(d_l-p)}{N}|h_l|^2 + \sum_{l:d_l>p+G}^{d_{L-1}}\frac{2(d_l-G-p)}{N}|h_l|^2 + \delta_\eta^2}.$$

Another method to derive the C/N ratio, at 526, is provided in the next section by considering a frequency domain signal model. Equation (34) represents a theoretical value for the C/N ratio because, by representing signal and noise components in the frequency domain, a difference between theoretical and approximate power of signal and noise components can be more clearly distinguished.

Exemplary Frequency Domain Model of the Received Signal and C/N Calculation

The received signal may be also represented by employing a frequency domain signal model. The difference between theoretical and approximate power of desired signal, as well as the difference between theoretical and approximate power of noise components (power of ICI and ISI components) may be more clearly distinguished than in the case when only the time domain received signal model is utilized.

Figure 10:
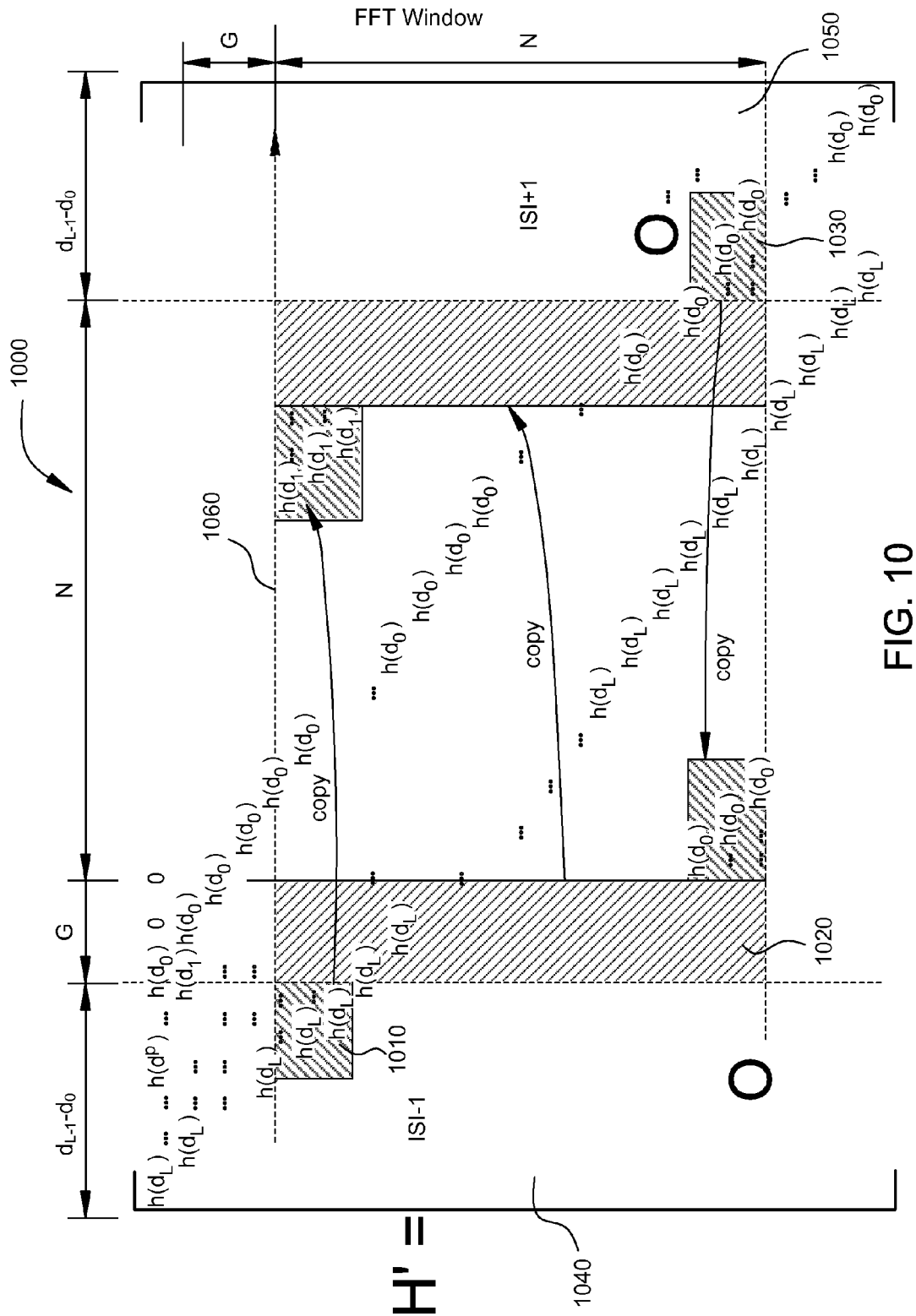
FIG. 10 illustrates a structure of the circular block channel matrix in accordance with certain embodiments of the present disclosure.

For a more convenient analysis, the received signal model given by equation (7) may be rephrased with a matrix signal model as follows:

$$r'=H'\cdot s' \tag{22}$$

where r' is a $(N+G+(d_{L-1}-d_0))\times 1$ column vector that represents a received signal, H' is a time domain block channel matrix of size $(N+G+(d_{L-1}-d_0))\times(N+G+2\cdot(d_{L-1}-d_0))$ illustrated in FIG. 10, and s' is a $(N+G+2\cdot(d_{L-1}-d_0))\times 1$ column vector denoting the transmission signal.

Considering the received signal within the FFT window of size N with a starting point at the position p, the matrix signal model may be represented as:

$$y=H_{ideal}\cdot s+H_{ISI_{-1}}\cdot s_{-1}+H_{ISI_{+1}}\cdot s_{+1} \tag{23}$$

where $H_{ideal}$ is an N×N matrix formed by copying the column 1020 of size N×G to the right side as illustrated in FIG. 10, $s_{-1}, s, s_{+1}$, are the (i−1)th, ith, (i+1)th OFDM symbols, respectively, and $H_{ISI_{-1}}$, and $H_{ISI+1}$ are the ISI channel matrices 1040 and 1050 after zero-padding of size N×($d_{L-1}$−$d_0$).

The matrix signal model from equation (23) may be expressed in the frequency domain as:

$$Y = (F \times H_{ideal} \times F^H) \cdot S + (F \times H_{ISI_{-1}} \times F^H)S_{-1} + \quad (24)$$
$$(F \times H_{ISI_{-1}} \times F^H)S_{+1} = diag(F \times H_{ideal} \times F^H) \cdot S +$$
$$(F \times \Delta H \times F^H)S + (F \times H_{ISI_{-1}} \times F^H)S_{-1} + (F \times H_{ISI_{+1}} \times F^H)S_{+1},$$

where F is the FFT transformation matrix of size N×N, the $diag(F \times H_{ideal} \times F^H)$ is the frequency response of the desired received signal, and $\Delta H$ is the non-diagonal channel matrix that corresponds to the ICI component.

Similarly as the time domain received signal is modeled by expression (20), the matrix signal model in the frequency domain given by equation (24) may be also represented as:

$$Y = (F \times H_{circ} \times F^H)S + (F \times H_{ICI} \times F^H)S + \quad (25)$$
$$(F \times H_{ISI_{-1}} \times F^H)S_{-1} + (F \times H_{ISI_{+1}} \times F^H)S_{+1} =$$
$$(F \times H_{circ} \times F^H)S - (F \times \hat{H}_{err} \times F^H)S + (F \times \Delta H \times F^H)S +$$
$$(F \times H_{ISI-1} \times F^H)S_{-1} + (F \times H_{ISI_{+1}} \times F^H)S_{+1} =$$
$$(F \times H_{circ} \times F^H)S - (F \times \hat{H}_{err} \times F^H)S + (F \times \Delta H \times F^H)S +$$
$$(F \times H_{ISI_{-1}} \times F^H)S_{-1} + (F \times H_{ISI_{-1}} \times F^H)S_{+1},$$

where $F \times \hat{H}_{err} \times F^H$ and $F \times H_{circ} \times F^H$ are diagonal matrices. $H_{circ}$ is an N×N circular matrix denoting the middle portion 1060 of block matrix H' from FIG. 10. The block-column 1020 of size G×N may be copied to the right side of matrix H' to generate the circular matrix $H_{circ}$. The copy operation may be also applied to the sub-block 1010 and the sub-block 1030, and these copy operations are equivalent to the cyclic postfix and cyclic prefix extension operations illustrated in FIG. 7 and FIG. 9, respectively. Matrix $\hat{H}_{err}$ represents an error factor represented in the frequency domain introduced due to an approximate modeling of the received signal.

After comparing equation (24) and equation (25), following relations may be derived:

$$F \times H_{circ} \times F^H = diag(F \times H_{ideal} \times F^H) + F \times \hat{H}_{err} \times F^H \quad (26)$$

and $$F \times H_{ICI} \times F^H = F \times \hat{H}_{err} \times F^H + F \times \Delta H \times F^H \quad (27)$$

Therefore, in the time domain signal model given by equation (20), as well as in the frequency domain signal model given by equation (25), the approximate signal power and the approximate noise power may be increased by the error factor $\hat{H}_{err}$ compare to theoretical values. In order to obtain the theoretical C/N ratio value based on the frequency domain signal model given by equation (24), energy from the term $F \times \hat{H}_{err} \times F^H$ and energy from the cross-value between terms $diag(F \times H_{ideal} \times F^H)$ and $F \times \hat{H}_{err} \times F^H$ may need to be removed from the numerator in equation (21). Similarly, according to equations (26) and (27), energy from the term $F \times \hat{H}_{err} \times F^H$ may need to be removed from the denominator of equation (21).

Channel impulse response corresponding to the error component IFFT($diag(F \times \hat{H}_{err} \times F^H)$) may be represented in time domain as:

$$\hat{h}_{err}(n) = \sum_{l=0}^{L-1} \hat{h}_{err,l}\delta(n - d_l), \quad (28)$$

where $$\hat{h}_{err,l} = \begin{cases} \dfrac{-(d_l - p)}{N}h_l & \text{where } d_l < p \\ 0 & \text{where } p \le d_l < p + G \\ \dfrac{(d_l - G - p)}{N}h_l & \text{where } d_l \ge p + G. \end{cases} \quad (29)$$

Expressions (28) and (29) may be verified for an exemplary case when the channel path delay $d_l$ satisfies $p-N<d_l<p$. The estimated sample at the jth subcarrier may be given as:

$$\hat{S}_j = \frac{1}{N}\sum_{n=p}^{p+N-1} \exp\left(j2\pi\frac{j}{N}(n-p)\right) \cdot \sum_{i=0}^{N-1} H_i\exp(\phi_i) \cdot \quad (30)$$
$$S_i\exp\left(-j2\pi\frac{i}{N}(n-p)\right) =$$
$$= \frac{1}{N}\sum_{n=p}^{d_l+N-1} \exp\left(j2\pi\frac{j}{N}(n-p)\right) \cdot \sum_{i=0}^{N-1} H_i\exp(\phi_i) \cdot$$
$$S_i\exp\left(-j2\pi\frac{i}{N}(n-p)\right) +$$
$$+ \frac{1}{N}\sum_{n=d_l+N}^{p+N-1} \exp\left(j2\pi\frac{j}{N}(n-p)\right) \cdot \sum_{i=0}^{N-1} H_i\exp(\phi_i) \cdot$$
$$S_i\exp\left(-j2\pi\frac{i}{N}(n-p)\right) =$$
$$= \frac{1}{N}\sum_{n=p}^{d_l+N-1} \exp\left(j2\pi\frac{j}{N}(n-p)\right) \cdot \underset{desired}{H_j \exp(\phi_j)} \cdot$$
$$S_j \cdot \exp\left(-j2\pi\frac{j}{N}(n-p)\right) + + \frac{1}{N}\sum_{n=p}^{d_l+N-1}\exp\left(j2\pi\frac{j}{N}(n-p)\right) \cdot$$
$$\sum_{\substack{i=0,i\ne j \\ ICI}}^{N-1} H_i\exp(\phi_i) \cdot S_i\exp\left(-j2\pi\frac{i}{N}(n-p)\right) + +$$
$$\frac{1}{N}\sum_{n=d_l+N}^{p+N-1}\exp\left(j2\pi\frac{j}{N}(n-p)\right) \cdot$$
$$\sum_{\substack{i=0 \\ ISI}}^{N-1} H_i\exp(\phi_i) \cdot S_i\exp\left(-j2\pi\frac{i}{N}(n-p)\right)$$

Expression (30) can be also written in the simplified form as:

$$\hat{S}_j = \left(1 - \frac{(p - d_l)}{N}\right) \cdot H_j\exp(\phi_j) \cdot S_j + ISI + ICI + \delta_n^2, \quad (31)$$

where $H_j$ is the frequency domain channel response represented with the circular channel matrix under the condition that the CP length is larger than the CIR length, $\exp(\phi_j) = \exp(2\pi j(d_l-p)/N)$ is the phase rotation due to the FFT window offset, and $\delta_n^2$ is the noise variance at the jth subcarrier.

According to the equation (31), a weakening factor of the frequency channel response due to the FFT window offset may be constant for all subcarriers, and may be represented in time domain as:

$$\tilde{h}_{err,l} = \begin{cases} \frac{-(d_l - p)}{N} h_l & \text{where } d_l < p \\ 0 & \text{where } p \leq d_l < p + G \\ \frac{(d_l - G - p)}{N} h_l & \text{where } d_l \geq p + G \end{cases} \quad (32)$$

After removing the energy of error component $\hat{H}_{err}$ given by equation (29), the theoretical C/N ratio derived according to the frequency domain signal model defined by equation (24) may be given as:

$$\frac{C}{N} = \frac{\displaystyle\sum_{l:l=p}^{d_l<p+G} |h_l|^2 + \sum_{l:l=0}^{d_l<p} \left(\frac{N-p+d_l}{N}\right)^2 |h_l|^2 + \sum_{l:d_l>p+G}^{d_{L-1}} \left(\frac{N-(d_l-G-p)}{N}\right)^2 |h_l|^2}{\displaystyle\sum_{l:l=0}^{d_l<p}\left(\frac{2(p-d_l)}{N} - \left(\frac{(p-d_l)}{N}\right)^2\right)|h_l|^2 + \sum_{l:d_l>p+G}^{d_{L-1}}\left(\frac{2(d_l-G-p)}{N} - \left(\frac{d_l-G-p}{N}\right)^2\right)|h_l|^2 + \delta_\eta^2}, \quad (33)$$

where $d_0 + N > p$ and $d_{L-1} < p + G + N$. It should be noted that if $d_0 + N < p$ and $d_{L-1} > p + G + N$, then the energy from the arbitrary lth channel path may be included in the noise variance term $\delta_\eta^2$ of equation (33) representing the ISI component.

An optimal position of the FFT window that maximizes the theoretical C/N ratio given by equation (33) may be derived, at 528 in FIG. 5, as:

$$p_{opt} = \arg\max_p \left(\frac{C}{N}(p)\right). \quad (34)$$

On the other hand, an approximate FFT window position may be derived in an effort to optimize the approximate C/N ratio given by equation (21).

The FFT window position may be updated, at 530 in FIG. 5, based on the optimal position of FFT window derived in equation (34). The adjustment of the optimal FFT window position may be performed for every data frame, which corresponds to the time period of 5 msec for a wireless system specified by the WiMAX standard.

It can be shown in the present disclosure that the expression (33) may be also obtained by considering the time domain signal model. An exemplary case can be analyzed when the channel path delay $d_l$ satisfies $p - N < d_l < p$. It can be observed from FIG. 6 that only a partial energy of the ith OFDM symbol may be collected within the FFT window of size N from the arbitrary lth channel path, while the ISI from the (i+1)th OFDM symbol may also be captured within the FFT window (block 610 in FIG. 6).

A partial energy of the ith OFDM symbol from the arbitrary lth channel path may be collected within the rectangular window $\text{rect}(p \leq n < N + d_l)$. It is well known that the frequency response of the rectangular window $\text{FFT}(\text{rect}(p \leq n < N + d_l))$ may be represented as:

$$W_R(e^{j\omega}) = e^{-j\left(\frac{N-(p-d_l)}{2}\right)\omega} \frac{\sin\left(\frac{\omega \cdot (N - (p - d_l))}{2}\right)}{\sin\left(\frac{\omega}{2}\right)}, \quad (35)$$

where $$\omega = \frac{2\pi k}{N}$$

and $W_R(e^{j0}) = N - (p - d_l)$.

Because a multiplication in time domain is equivalent to a convolution in the frequency domain, a weakening factor of the desired signal equal to $$\frac{N - (p - d_l)}{N}$$

may be introduced at every subcarrier n. For the sake of simplicity, it can be assumed that $s_i(n) = 1$, $0 < n < N + G$. Then, the desired signal power from the arbitrary lth channel path captured within the FFT window of size N samples may be obtained as:

$$\delta_{desired,l}^2 = \left(\frac{N - (p - d_l)}{N}\right)^2 |h_l|^2. \quad (36)$$

It can be observed from equation (36) that the energy of desired signal from the arbitrary lth channel path with $p - N < d_l < p$ may be exactly same as the second component of the numerator of equation (33).

According to the well known Parseval theorem, the following equality holds:

$$\sum_{n=0}^{N-1} |s_i(n)|^2 = \frac{1}{N} \sum_{k=0}^{N-1} |S_i(k)|^2. \quad (37)$$

Therefore, the ICI power from the 0-th subcarrier (i.e., no ICI from other subcarriers) may be obtained as:

$$\delta_{ICI}^2 = \frac{\left(\sum_{n=0}^{N-(p-d_l)-1} 1 - \frac{1}{N}(N - (p - d_l))^2\right)}{N} |h_l|^2 = \\ \frac{(N(p - d_l))}{N}|h_l|^2 - \left(\frac{N - (p - d_l)}{N}\right)^2 |h_l|^2 = \\ \frac{(p - d_l)}{N}|h_l|^2 - \left(\frac{p - d_l}{N}\right)^2 |h_l|^2. \quad (38)$$

It can be observed that the ICI energy from the arbitrary lth channel path with $p - N < d_l < p$ may correspond to the first component in the denominator of equation (33).

Exemplary Channel and Noise Estimations

Channel estimates in the frequency domain may be represented with diagonal terms of the ideal frequency domain channel matrix $F \times H_{ideal} \times F^H$. According to equation (26), the frequency domain channel estimates may be defined as:

$$\text{diag}(F \times H_{ideal} \times F^H) = F \times H_{circ} \times F^H - F \times \hat{H}_{err} \times F^H \quad (39)$$

According to expressions (28) and (29) that represent the error factor in time domain, an equivalent time domain channel response may be computed as:

$$\hat{h}_{ideal}(n) = \sum_{l=0}^{L-1} \hat{h}_{ideal,l} \delta(n - d_l), \quad (40)$$

where the gain of the arbitrary lth channel path may be defined as:

$$\hat{h}_{ideal,l} = \begin{cases} \frac{N + (d_l - p)}{N} h_l & \text{where } d_l < p \\ h_l & \text{where } p \leq d_l < p + G \\ \frac{N - (d_l - G - p)}{N} h_l & \text{where } d_l \geq p + G. \end{cases} \quad (41)$$

Estimation of the noise power at the receiver may be directly determined based on previously computed theoretical values of C/N ratio. According to the equation (33), the noise power may be estimated as:

$$N = \sum_{l:l=0}^{d_l < p} \left( \frac{2(p - d_l)}{N} - \left(\frac{(p - d_l)}{N}\right)^2 \right) |h_l|^2 + \sum_{l:d_l > p+G}^{d_{L-1}} \left( \frac{2(d_l - G - p)}{N} - \left(\frac{d_l - G - p}{N}\right)^2 \right) |h_l|^2 + \delta_\eta^2. \quad (42)$$

Exemplary Simulation Results

In order to verify accuracy of a theoretical expression for the C/N ratio value, the result of equation (33) may be compared with the measured (approximate) C/N ratio given by expression (21). In order to simplify simulations, an exemplary case of two channel paths with equal energy may be considered. The CIR length may be larger than the CP length. As an example, the size of FFT operation may be set to 1024, the CP length may be equal to 128 and the CIR length may be equal to 225 samples.

Figure 11:
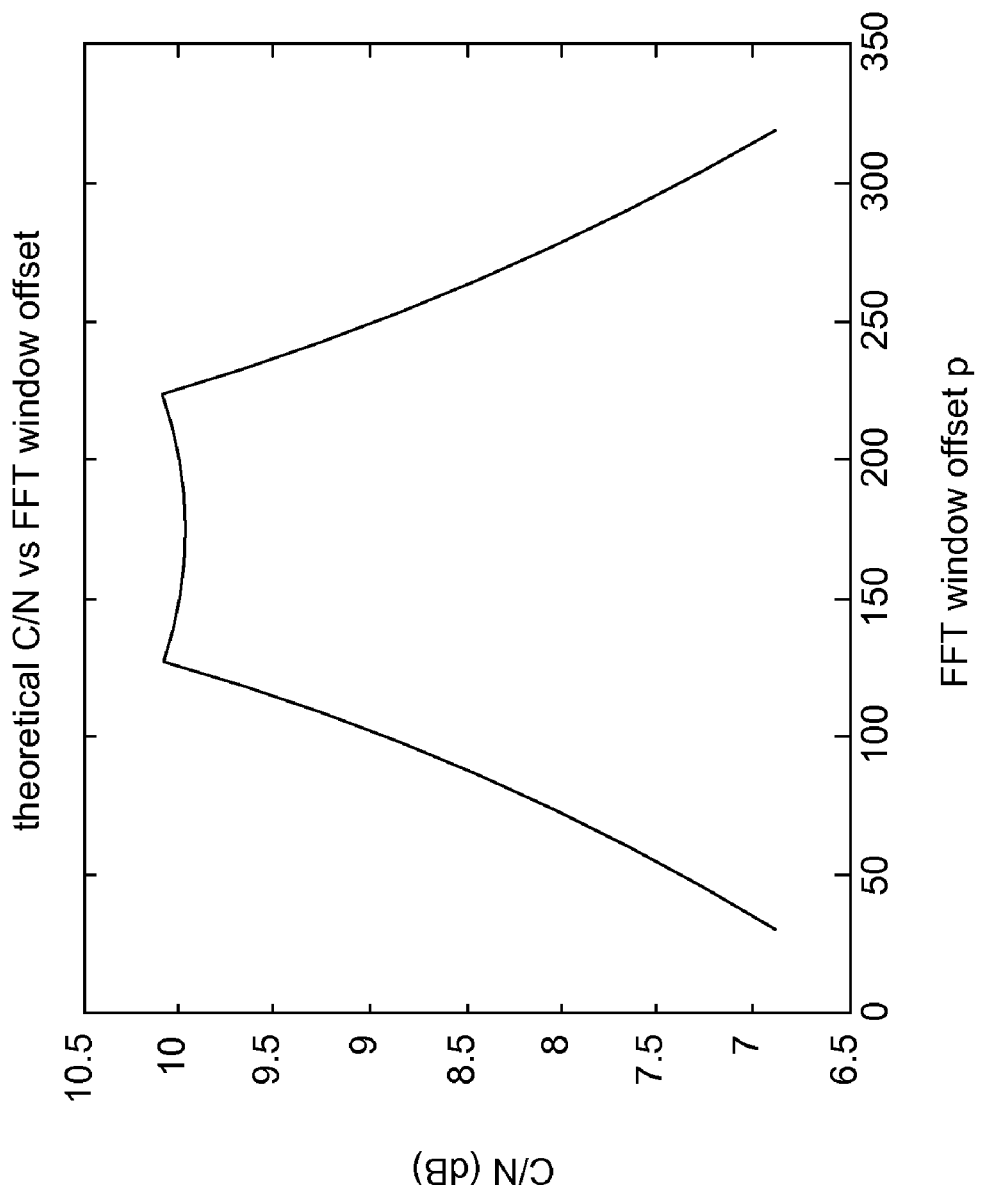
FIG. 11 shows theoretical C/N ratio values as a function of the position of FFT window in accordance with certain embodiments of the present disclosure.
Figure 12:
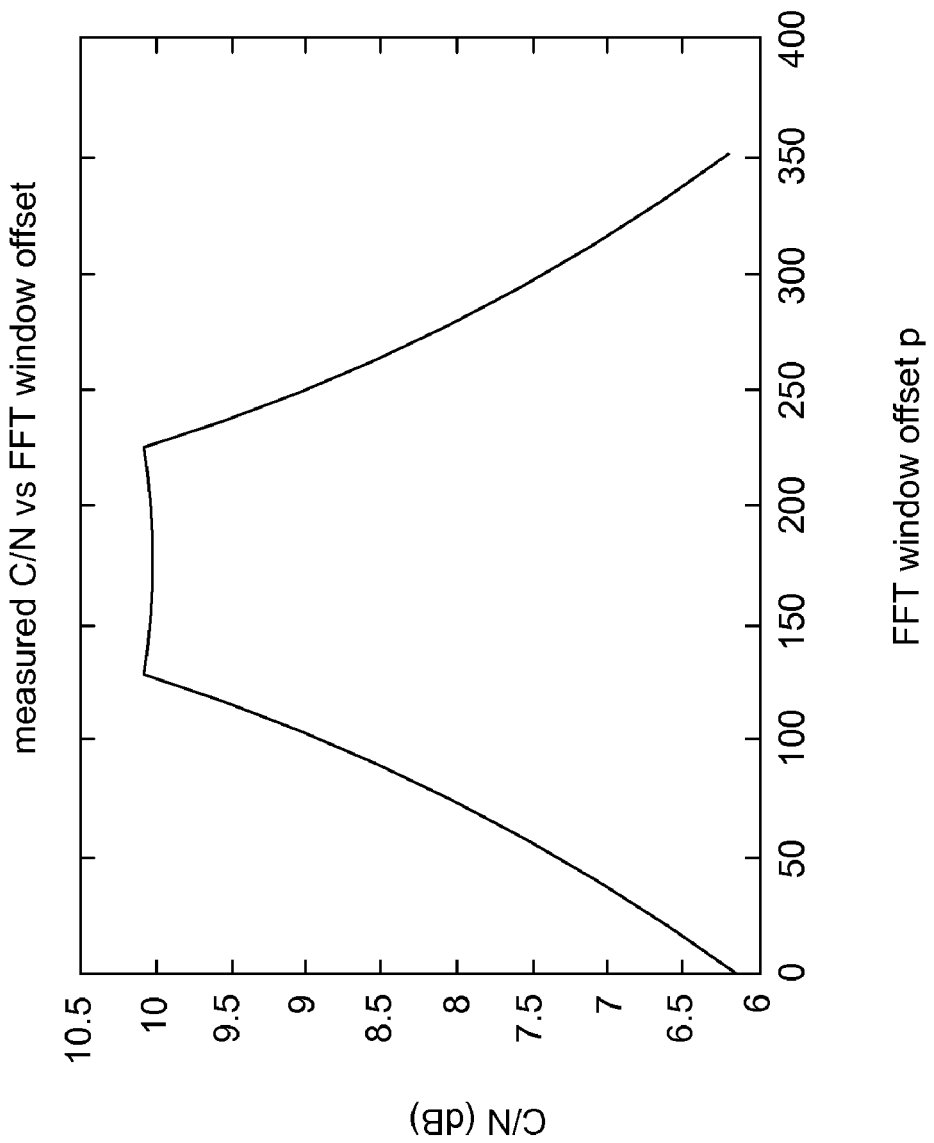
FIG. 12 shows measured C/N ratio values as a function of the position of FFT window in accordance with certain embodiments of the present disclosure.

The theoretical C/N ratio value may be computed as a function of the FFT window position p from expression (33), and it is illustrated in FIG. 11. By utilizing the expression (21), the approximate C/N ratio value may be measured at the receiver side as a function of the FFT window position, and it is shown in FIG. 12. It can be observed that the theoretical C/N ratio values illustrated in FIG. 11 are almost identical with measured results from FIG. 12.

Figure 5A:
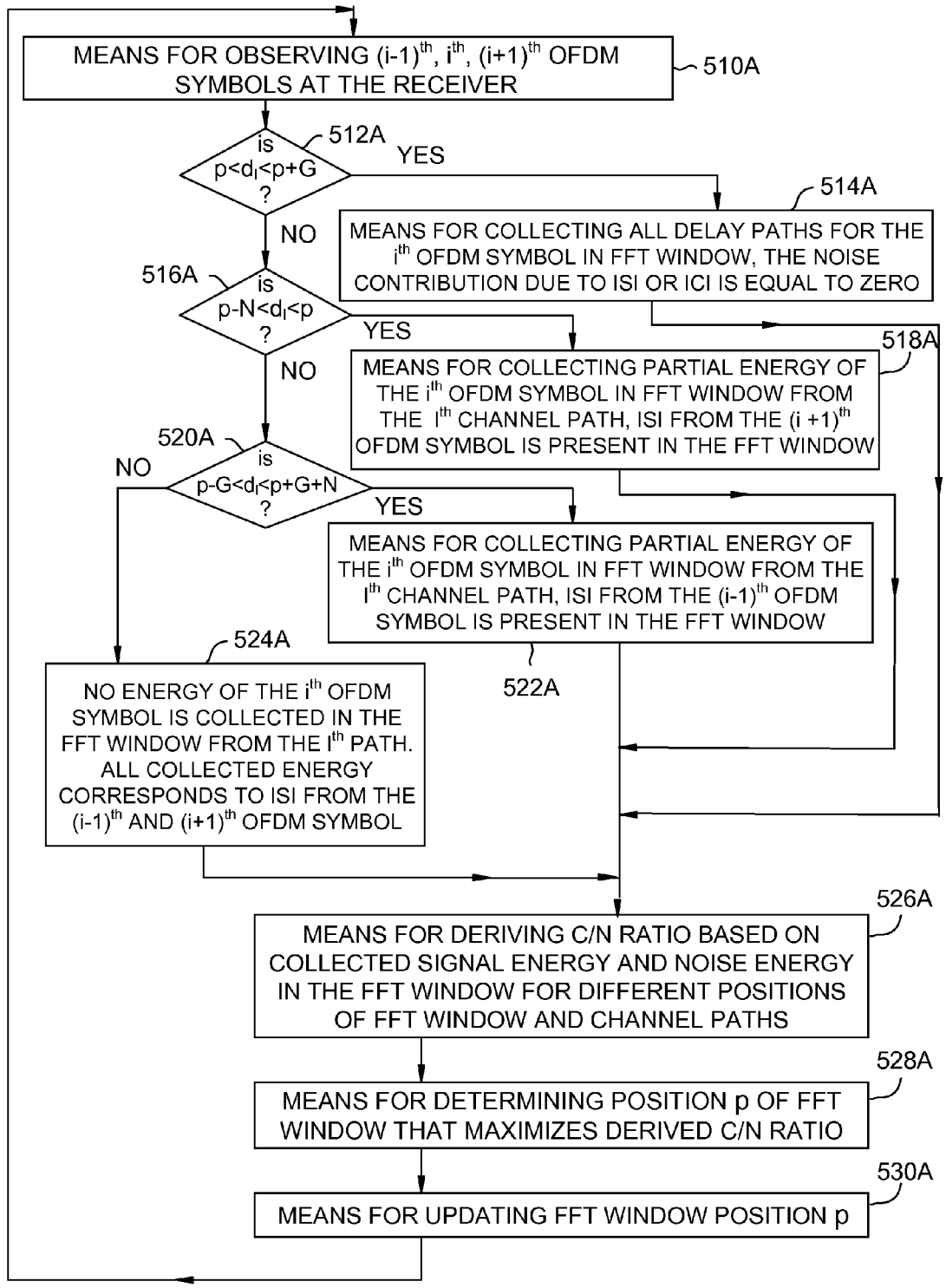
FIG. 5A illustrates example components capable of performing the operations illustrated in FIG. 5.

The various operations of methods described above may be performed by various hardware and/or software component(s) and/or module(s) corresponding to means-plus-function blocks illustrated in the Figures. For example, blocks 510-530 illustrated in FIG. 5 correspond to means-plus-function blocks 510A-530A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for determining an optimal position of a Fast Fourier Transform (FFT) window at a receiver of an orthogonal frequency division multiplex (OFDM) wireless communication system under the condition that the channel impulse response (CIR) length is larger than the cyclic prefix (CP) length, comprising:
   receiving a plurality of adjacent OFDM symbols in time where the received signal is modeled in a frequency domain;
   estimating a power of a desired signal collected inside the FFT window for a currently processed OFDM symbol from an arbitrary channel path based on different relative positions between a beginning of the FFT window and a time delay of arbitrary channel path;
   estimating a power of the noise collected inside the FFT window for the currently processed OFDM symbol from the arbitrary channel path based on different relative positions between the beginning of the FFT window and the time delay of arbitrary channel path;
   computing a theoretical carrier-to-noise (C/N) ratio at the receiver as a function of the FFT window position based on the estimated power of desired signal and the estimated power of the noise; and
   determining the optimal position of the FFT window in an effort to optimize the theoretical C/N ratio value at the receiver.

2. The method of claim 1, wherein computing a theoretical carrier-to-noise (C/N) ratio at the receiver as a function of the FFT window position based on the estimated power of desired signal and the estimated power of the noise comprises:
   deriving an approximate C/N ratio at the receiver based on a time domain signal model which includes error factors due to simplification;
   evaluating error factors as a part of the estimated desired signal power and as the part of the estimated power of noise; and
   removing estimated error factors from the estimated power of the desired signal and from the estimated power of the noise to obtain an error-free estimated power of the desired signal and an error-free estimated power of noise.

3. The method of claim 1, further comprising updating the optimal position of FFT window for different OFDM frames.

4. The method of claim 1, further comprising:
   computing an approximate carrier-to-noise (C/N) ratio at the receiver as a function of the FFT window position based on the estimated power of desired signal and the estimated power of noise; and
   determining a position of the FFT window in an effort to optimize the approximate C/N ratio value at the receiver.

5. The method of claim 1, further comprising estimating channel impulse response based on estimated error factors.

6. The method of claim 1, further comprising estimating power of noise at the receiver based on a theoretical carrier to noise (C/N) ratio value.

7. An apparatus for determining an optimal position of a Fast Fourier Transform (FFT) window at a receiver of an orthogonal frequency division multiplex (OFDM) wireless communication system under the condition that the channel impulse response (CIR) length is larger than the cyclic prefix (CP) length, comprising:
   logic for receiving a plurality of adjacent OFDM symbols in time where the received signal is modeled in a frequency domain;
   logic for estimating a power of a desired signal collected inside the FFT window for a currently processed OFDM symbol from an arbitrary channel path based on different relative positions between a beginning of the FFT window and a time delay of arbitrary channel path;
   logic for estimating a power of the noise collected inside the FFT window for the currently processed OFDM symbol from the arbitrary channel path based on different relative positions between the beginning of the FFT window and the time delay of arbitrary channel path;
   logic for computing a theoretical carrier-to-noise (C/N) ratio at the receiver as a function of the FFT window position based on the estimated power of desired signal and the estimated power of the noise; and
   logic for determining the optimal position of the FFT window in an effort to optimize the theoretical C/N ratio value at the receiver.

8. The apparatus of claim 7, wherein the logic for computing a theoretical carrier-to-noise (C/N) ratio at the receiver as a function of the FFT window position based on the estimated power of desired signal and the estimated power of the noise comprises:
   logic for deriving an approximate C/N ratio at the receiver based on a time domain signal model which includes error factors due to simplification;
   logic for evaluating error factors as a part of the estimated desired signal power and as the part of the estimated power of noise; and
   logic for removing estimated error factors from the estimated power of the desired signal and from the estimated power of the noise to obtain an error-free estimated power of the desired signal and an error-free estimated power of noise.

9. The apparatus of claim 7, further comprising logic for updating the optimal position of FFT window for different OFDM frames.

10. The apparatus of claim 7, further comprising:
   logic for computing an approximate carrier-to-noise (C/N) ratio at the receiver as a function of the FFT window position based on the estimated power of desired signal and the estimated power of noise; and
   logic for determining a position of the FFT window in an effort to optimize the approximate C/N ratio value at the receiver.

11. The apparatus of claim 7, further comprising logic for estimating channel impulse response based on estimated error factors.

12. The apparatus of claim 7, further comprising logic for estimating power of noise at the receiver based on a theoretical carrier to noise (C/N) ratio value.

13. An apparatus for determining an optimal position of a Fast Fourier Transform (FFT) window at a receiver of an orthogonal frequency division multiplex (OFDM) wireless communication system under the condition that the channel impulse response (CIR) length is larger than the cyclic prefix (CP) length, comprising:
- means for receiving a plurality of adjacent OFDM symbols in time where the received signal is modeled in frequency domain;
- means for estimating a power of a desired signal collected inside the FFT window for a currently processed OFDM symbol from an arbitrary channel path based on different relative positions between a beginning of the FFT window and a time delay of arbitrary channel path;
- means for estimating a power of the noise collected inside the FFT window for the currently processed OFDM symbol from the arbitrary channel path based on different relative positions between the beginning of the FFT window and the time delay of arbitrary channel path;
- means for computing a theoretical carrier-to-noise (C/N) ratio at the receiver as a function of the FFT window position based on the estimated power of desired signal and the estimated power of the noise; and
- means for determining the optimal position of the FFT window in an effort to optimize the theoretical C/N ratio value at the receiver.

14. The apparatus of claim 13, wherein the means for computing a theoretical carrier-to-noise (C/N) ratio at the receiver as a function of the FFT window position based on the estimated power of desired signal and the estimated power of the noise comprises:
- means for deriving an approximate C/N ratio at the receiver based on a time domain signal model which includes error factors due to simplification;
- means for evaluating error factors as a part of the estimated desired signal power and as the part of the estimated power of noise; and
- means for removing estimated error factors from the estimated power of the desired signal and from the estimated power of the noise to obtain an error-free estimated power of the desired signal and an error-free estimated power of noise.

15. The apparatus of claim 13, further comprising means for updating the optimal position of FFT window for different OFDM frames.

16. The apparatus of claim 13, further comprising:
- means for computing an approximate carrier-to-noise (C/N) ratio at the receiver as a function of the FFT window position based on the estimated power of desired signal and the estimated power of noise; and
- means for determining a position of the FFT window in an effort to optimize the approximate C/N ratio value at the receiver.

17. The apparatus of claim 13, further comprising means for estimating channel impulse response based on estimated error factors.

18. The apparatus of claim 13, further comprising means for estimating power of noise at the receiver based on a theoretical carrier to noise (C/N) ratio value.

19. A computer-program product for determining an optimal position of a Fast Fourier Transform (FFT) window at a receiver of an orthogonal frequency division multiplex (OFDM) wireless communication system under the condition that the channel impulse response (CIR) length is larger than the cyclic prefix (CP) length, comprising a computer readable medium having instructions stored thereon, the instructions being executable by one or more processors and the instructions comprising:
- instructions for receiving a plurality of adjacent OFDM symbols in time where the received signal is modeled in frequency domain;
- instructions for estimating a power of a desired signal collected inside the FFT window for a currently processed OFDM symbol from an arbitrary channel path based on different relative positions between a beginning of the FFT window and a time delay of arbitrary channel path;
- instructions for estimating a power of the noise collected inside the FFT window for the currently processed OFDM symbol from the arbitrary channel path based on different relative positions between the beginning of the FFT window and the time delay of arbitrary channel path;
- instructions for computing a theoretical carrier-to-noise (C/N) ratio at the receiver as a function of the FFT window position based on the estimated power of desired signal and the estimated power of the noise; and
- instructions for determining the optimal position of the FFT window in an effort to optimize the theoretical C/N ratio value at the receiver.

20. The computer-program product of claim 19, wherein the instructions for computing a theoretical carrier-to-noise (C/N) ratio at the receiver as a function of the FFT window position based on the estimated power of desired signal and the estimated power of the noise comprise:
- instructions for deriving an approximate C/N ratio at the receiver based on a time domain signal model which includes error factors due to simplification;
- instructions for evaluating error factors as a part of the estimated desired signal power and as the part of the estimated power of noise; and
- instructions for removing estimated error factors from the estimated power of the desired signal and from the estimated power of the noise to obtain an error-free estimated power of the desired signal and an error-free estimated power of noise.

21. The computer-program product of claim 19, wherein the instructions further comprise instructions for updating the optimal position of FFT window for different OFDM frames.

22. The computer-program product of claim 19, wherein the instructions further comprise:
- instructions for computing an approximate carrier-to-noise (C/N) ratio at the receiver as a function of the FFT window position based on the estimated power of desired signal and the estimated power of noise; and
- instructions for determining a position of the FFT window in an effort to optimize the approximate C/N ratio value at the receiver.

23. The computer-program product of claim 19, wherein the instructions further comprise instructions for estimating channel impulse response based on estimated error factors.

24. The computer-program product of claim 19, wherein the instructions further comprise instructions for estimating power of noise at the receiver based on a theoretical carrier to noise (C/N) ratio value.

* * * * *